United States Patent
Aguilar et al.

(10) Patent No.: US 6,892,297 B1
(45) Date of Patent: May 10, 2005

(54) METHOD AND SYSTEM FOR SEARCHING AN UPDATED VERSION OF BOOT CODE FOR UPDATING CURRENT RUNNING BOOT CODE PRIOR TO LOADING AN OPERATING SYSTEM

(75) Inventors: Maximino Aguilar, Austin, TX (US); Sanjay Gupta, Austin, TX (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/527,398

(22) Filed: Mar. 16, 2000

(51) Int. Cl.[7] .................. G06F 9/445; G06F 15/177; A06F 11/30
(52) U.S. Cl. ................. 713/2; 713/1; 713/191
(58) Field of Search ............... 713/2, 1, 191, 713/100; 714/100, 4

(56) References Cited

U.S. PATENT DOCUMENTS

| | | | | |
|---|---|---|---|---|
| 5,704,031 A | * | 12/1997 | Mikami et al. | 714/4 |
| 5,799,187 A | * | 8/1998 | McBrearty | 713/2 |
| 5,864,698 A | * | 1/1999 | Krau et al. | 713/2 |
| 6,199,204 B1 | * | 3/2001 | Donohue | 717/178 |
| 6,202,091 B1 | * | 3/2001 | Godse | 709/222 |
| 6,275,931 B1 | * | 8/2001 | Narayanaswamy et al. | 713/2 |
| 6,584,559 B1 | * | 6/2003 | Huh et al. | 713/2 |

FOREIGN PATENT DOCUMENTS

JP   10269075 A   * 10/1998   ............. G06F/9/06

OTHER PUBLICATIONS

Stickley Software, Inc; Boot Flash Advice Please; Jan. 29, 1997; Newsgroups: comp.arch.embedded; pp. 6 (Message 7 in thread).*

Jerry Jex, Flash memory bios for pc and notebook computers, 1991, IEEE.*

* cited by examiner

*Primary Examiner*—Thomas Lee
*Assistant Examiner*—Suresh Suryawanshi
(74) *Attorney, Agent, or Firm*—Duke W. Yee; Joscelyn G. Cockburn; Francis Lammes

(57) ABSTRACT

A method and apparatus for updating a current boot code in a data processing system in which the current boot code is used to load an operating system from a storage device. The storage device is searched for an updated boot code for the operating system in response to starting the data processing system. The current boot code is updated prior to loading the operating system for the data processing system if the updated boot code is present in the storage device.

36 Claims, 2 Drawing Sheets

US 6,892,297 B1

METHOD AND SYSTEM FOR SEARCHING AN UPDATED VERSION OF BOOT CODE FOR UPDATING CURRENT RUNNING BOOT CODE PRIOR TO LOADING AN OPERATING SYSTEM

CROSS REFERENCE TO RELATED APPLICATIONS

The present invention is related to applications entitled AUTOMATIC RECOVERY OF A CORRUPTED BOOT IMAGE IN A DATA PROCESSING SYSTEM, Ser. No. 09/527,397, METHOD AND APPARATUS FOR COPYING A BOOTABLE IMAGE FROM A NETWORK TO A LOCAL BOOT DEVICE IN A DATA PROCESSING SYSTEM, Ser. No. 09/527,399, all of which are filed even date hereof, assigned to the same assignee, and incorporated herein by reference.

BACKGROUND OF THE INVENTION

1. Technical Field

The present invention relates generally to an improved data processing system and in particular to a method and apparatus for updating code in a data processing system. Still more particularly, the present invention relates to a method and apparatus for updating boot code in a data processing system.

2. Description of Related Art

When a computer is started or reset, instructions executed by a processor are used to load and start the operating system for the computer. These instructions are also referred to as "boot code". Typically, this function may be provided within a basic input/output system (BIOS). A BIOS provides a set of essential software routines that test the hardware at startup, start the operating system, and transfer the supportive data among hardware devices. Typically, BIOS's may be stored in a read-only memory (ROM) so that the BIOS may be executed when the computer is turned on.

Additionally, the BIOS may be stored on some other persistent storage device in which the BIOS may be updated, such as a flash memory. In booting the operating system, the instructions search for the operating system, load the operating system, and then pass control to the operating system.

Updates to operating systems often may require updates to the code used to boot the operating system. This code is also referred to as the "boot code". In some instances, if the operating system is updated to another version, a particular version of the boot code also may be required. If the boot code remains un-updated, the operating system may not be properly loaded by the boot code. In some cases, the operating system may not run at all. With frequent changes to operating systems, it may be difficult to ensure that the version of the boot code is the correct version required by the operating system.

Therefore, it would be advantageous to have an approved method and apparatus for maintaining a correct version of boot code for an operating system.

SUMMARY OF THE INVENTION

The present invention provides a method and apparatus for updating a current boot code in a data processing system in which the current boot code is used to load an operating system from a storage device. The storage device is searched for an updated boot code for the operating system in response to starting the data processing system. The current boot code is updated prior to loading the operating system for the data processing system if the updated boot code is present in the storage device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF TEE PREFERRED EMBODIMENT

Figure 1:
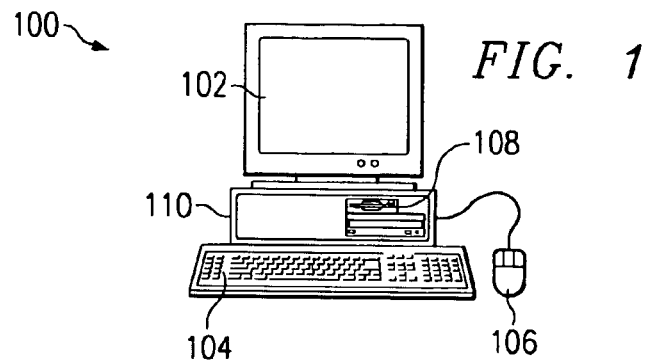
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
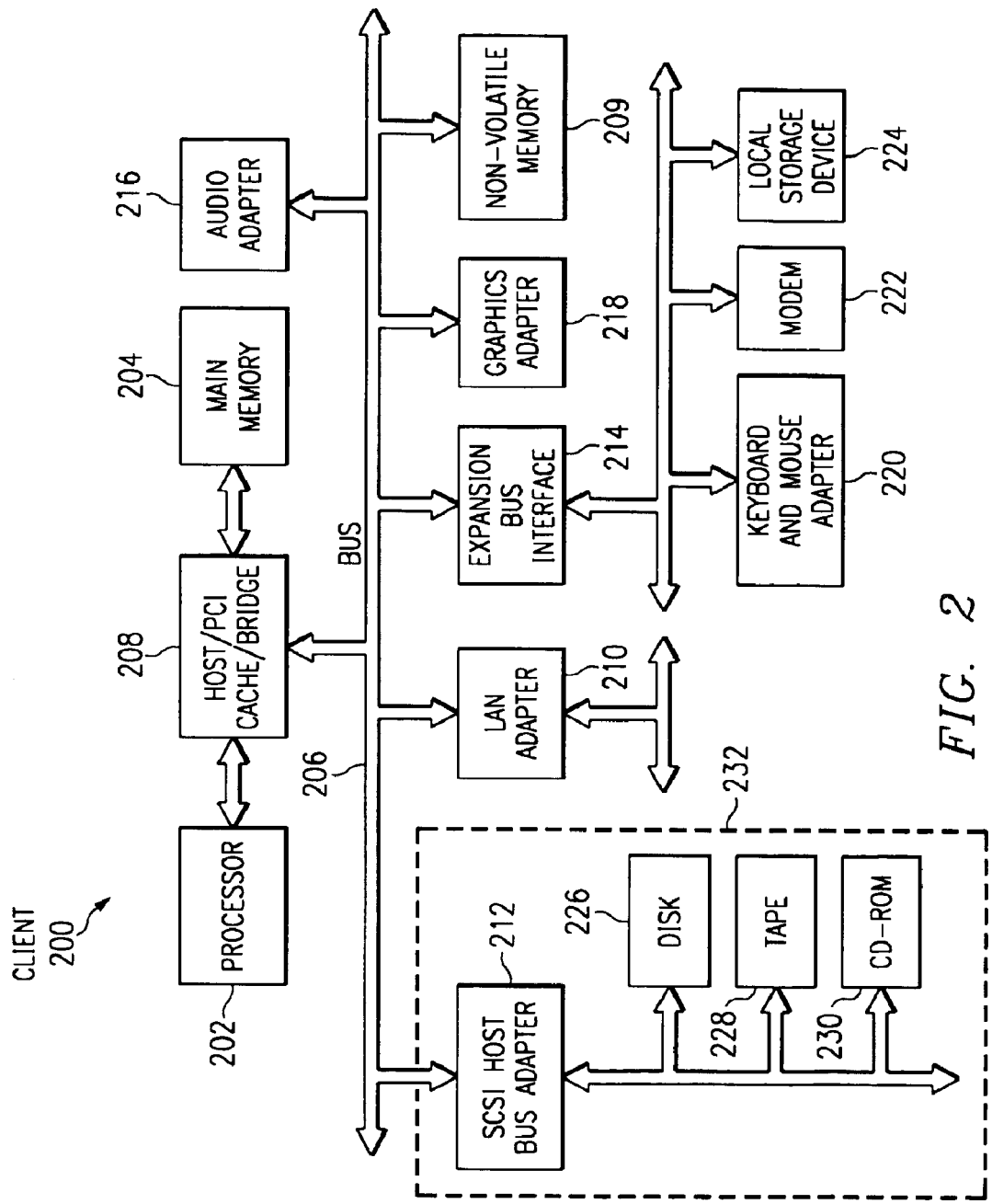
FIG. 2 is a block diagram of a data processing system shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Non-volatile memory 209 also is connected to PCI local bus 206 and, in this example, contains a BIOS, which includes a boot code. In this example, non-volatile memory 209 may take the form of a non-volatile random access memory or an erasable programmable read only memory (EPROM). In the depicted examples, the operating system also may be located in non-volatile memory 209.

Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, and graphics adapter 218 are connected to PCI local bus 206 by add-in boards inserted into expansion slots. Expansion bus interface 214 provides a connection for a keyboard and mouse adapter 220, modem 222, and local storage device 224. Local storage device 224, in this example, contains an image of the operating system. The boot code in non-volatile memory 209 will boot the operating system image located in local storage device 224. Local storage device 224 may take various forms, such as a flash memory. Flash memory is a memory chip than can be rewritten and hold its content without power. Flash memory is a type of non-volatile memory. Flash memory may take various forms, such as a memory stick, which is a flash memory card designed for various devices. These memories typically vary from 4 MB to 192 MB, but may come in larger sizes. Of course, local storage device 224 may take other forms, such as, for example, a floppy disk drive, a CD-ROM, or a read-only memory. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. Instructions for the operating system and applications or programs are located on storage devices, such as hard disk drive 226 and local storage device 224, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent non-volatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA) device, which is configured with ROM and/or flash memory in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The present invention provides a method, apparatus, and computer implemented instructions for updating the boot code. The mechanism of the present invention is initiated when a computer is started. The boot code will search a local storage device, such as local storage device 224, for the new boot code image. If the boot code image is found and this image is a later version than the one that is currently being used, the boot code will automatically update to the newer version, reboot, and then load and run the operating system.

In the depicted examples, the appropriate version of the boot code is stored in conjunction with the operating system in the same storage device. This version of the boot code is one that will properly boot or load the operating system. In these examples, a boot code image and the operating system are stored in local storage device 224. When the boot code currently being used in data processing system 200 is initiated, this boot code will search for a presence of an update boot code image in local storage device 224. If an update boot code image is found, the update boot code image in local storage device 224 is used to update the current boot code. Alternatively, the version of this image in local storage device 224 will be compared to that of the boot code in non-volatile memory 209. If the boot code currently being used is of the correct version, the system will continue to boot. Otherwise, an update will be made and the system will be restarted.

Of course, depending on the implementation, the update boot code image could be located in another location. For example, the current boot code image could be obtained through a network connection provided by LAN adapter 210 to a server or some other device.

In the depicted examples, the correct version of the boot code is located in the same storage device as the operating system. With this configuration, the boot code on the computer can always search for the boot file or image on the same storage device as the operating system.

Figure 3:
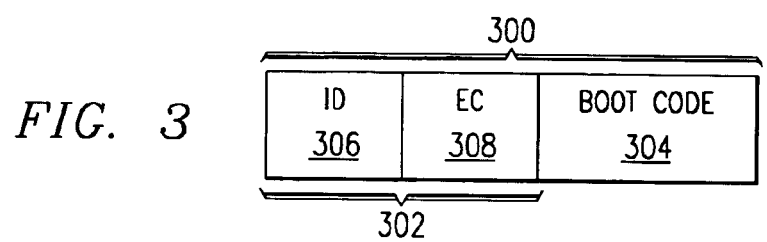
FIG. 3 is a block diagram of a boot code image in accordance with a preferred embodiment of the present invention.

Turning now to FIG. 3, a block diagram of a boot code image is depicted in accordance with a preferred embodiment of the present invention. Boot code image 300 includes a header 302 and boot code 304. Boot code 304 is an update boot code, which may be used to update the current boot code located in the non-volatile memory in the data processing system. In these examples, the update is a replacement of the current boot code with the update boot code. Of course, other types of updates may occur, such as replacing portions of the current boot code with the update boot code.

A check may be made to see whether boot code 304 should replace the current boot code. For example, a check may be made to see if boot code 304 is a newer version of the current boot code in these examples. This check is made, in this example, by examining information within header 302. Header 302, in this example, contains identification (ID) information 306 and error checking (EC) information 308. ID information 306 may contain, for example, a version number or other information used to determine whether to replace the current boot code with boot code 304.

Header 302 also may contain information to verify whether boot code image 300 is corrupted or contains errors. For example, checksum information or cyclical redundancy checking (CRC) information may be used to determine whether boot code image 300 is a good image or a corrupted image. A checksum is a calculated value used to test data for the presence of errors that can occur when data is transmitted or when it is written to a disk. The checksum is calculated for a chunk of data by sequentially combining all of the bytes of data with a series of arithmetic or logical operations. After the data is transmitted or stored, the new checksum is calculated in the same way using the transmitted or stored data. If the two checksums do not match, then an error has occurred and the data should be transmitted or stored again. CRC involves using a calculation to generate a number based on the data transmitted. The sending device performs the calculation before transmission and sends the result to a receiving device. The receiving device repeats the same calculation after transmission. If the result is the same, then the transmission is assumed to be error free. Of course, other mechanisms may be used to determine whether boot code 304 is error free. Of course, other mechanisms may be used to determine whether errors are present in the image.

Figure 4:
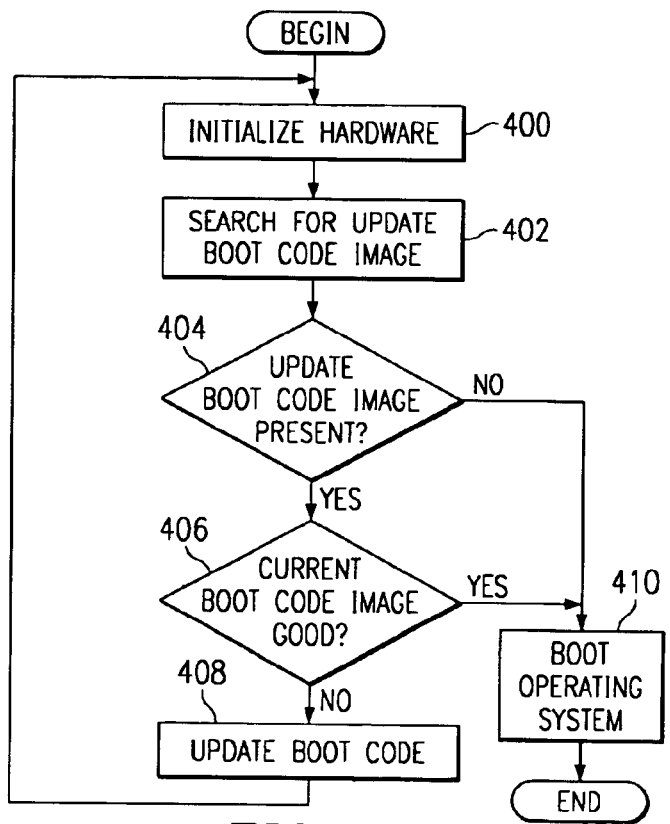
FIG. 4 is a flowchart of a process for booting a computer in accordance with a preferred embodiment of the present invention.

With reference now to FIG. 4, a flowchart of a process for booting a computer is depicted in accordance with a preferred embodiment of the present invention. The steps in FIG. 4 form a process used in boot code to form updates on a local storage device. This process may be implemented in a BIOS for a computer.

The process begins by initializing hardware (step 400). This initialization of hardware includes steps, such as, for example, searching for other BIOS's in plug-in boards that may be connected to the computer, setting up pointers, such as interrupt vectors, and memory to access those routines. A search is then made for the update boot code image (step 402). This image may be, for example, boot code image 300 in FIG. 3. This search is typically made on the same device on which the operating system for the computer is located. Of course, the search may be to other locations, such as another local storage device or even a remote storage device, such as a remote hard disk or server in communication with the computer.

A determination is made as to whether an update boot code image is present (step 404). This update boot code may be, for example, boot code image 300 in FIG. 3. In this example, if the update boot code image is present, a replacement will be made. Of course, in addition to determining whether an image is present, this step may include a comparison of the update boot code image with the current boot code image to determine whether an update should be made. This identification may be made in a variety of ways. For example, if the boot code image includes version information, this version information may be placed in a header in an image or file containing the boot code. The version information may be extracted from the header and compared to the version number for the current boot code to see whether the current version is the correct version. If the update boot code image is to be used to update the current boot code, then the result of step 404 indicates that an update boot code image has been present.

If another update boot code image is present, a check of this update boot code image is made to see if the update boot code image is a good image (step 406). This step is used to determine whether the update boot code image has errors or is corrupted. Step 406 may be performed using error checking information located in a header, such as EC information 308 which is for the update boot code image in FIG. 3.

If the current image is not a good image, then the boot code is updated (step 408). Step 408 involves copying the update boot code-image from the local storage into the flash memory in which the boot code is located on the computer. Thereafter, the process returns to step 400 to begin the initialization process again.

With reference back to step 404, if an update boot code image is absent, the operating system is booted (step 410) with the process terminating thereafter. With reference again to step 406, if the update boot code image is a good update boot code image, the process proceeds to step 410 to boot the operating system.

Thus, the present invention provides a method, apparatus, and computer implemented instructions for maintaining a correct version of boot code for use in booting an operating system. In one implementation, a local storage device, such as a flash memory, contains both the operating system and the update boot code image. In such a case, the handling of the operating system in the boot code enables access to a required version of the boot code at all times. Thus, whenever a new version of an operating system is introduced, the appropriate version of the boot code also may be included in the same local storage device. Alternatively, the boot code image may be located in a remote storage device or in some other local storage device. With a remote storage device, the current boot code may search a remote location to see whether updates have occurred for the boot code. In such a case, the computer must be initialized to a point such that the communications adapter in the computer is able to establish a data connection to allow a search for an updated boot code image.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROM's, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted examples place the update boot code image in the same location as the operating system, these two components may be placed in different locations. For example, the update boot code image may actually be located at a particular location, such as on a server. In this type of implementation, the mechanism of the present invention would look to that location to see whether an update boot code image is present. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for updating a current boot code in a data processing system in which the current boot code is used to load an operating system, the method comprising the data processing system implemented steps of:

loading a current boot code from a non-volatile memory;
 initiating a boot sequence using the current boot code;
 searching a storage device for an updated boot code for the operating system in response to initiating the boot sequence; and
 updating the current boot code in the non-volatile memory prior to loading the operating system for the data processing system if the updated boot code is present, wherein the updating step forms a new current boot code and further comprises:
  restarting the data processing system using the new current boot code; and
  loading the operating system using the new current boot code.

2. The method of claim 1, wherein the storage device is a non-volatile random access memory.

3. The method of claim 1, wherein the operating system is stored on the storage device.

4. The method of claim 3, wherein the storage device is a removable storage device locally connected to the data processing system.

5. The method of claim 1 further comprising:
 loading the operating system using the current boot code if the updated boot code is absent.

6. The method of claim 1, wherein the updating step comprises:
 replacing the current boot code with the updated boot code prior to loading the operating system.

7. The method of claim 1, wherein the updated boot code is present if a boot code is present on the storage device in which the boot code is a later version of the current boot code.

8. The method of claim 1, wherein the updated boot code is present if a boot code is located on the storage device.

9. A method in a data processing system for loading an operating system using a boot code, the method comprising:
 loading a current boot code;
 searching, by the current boot code, for an updated boot code prior to loading the operating system;
 determining, by the current boot code, whether the updated boot code is a later version of the current boot code; and
 updating the current boot code using the updated boot code responsive to the updated boot code being a later version of the current boot code, wherein the updating step forms a new current boot code and further comprises:
  restarting the data processing system using the new current boot code; and
  loading the operating system using the new current boot code.

10. The method of claim 9, wherein the searching step comprises:
 searching a local storage device for the updated boot code prior to loading the operating system.

11. The method of claim 10, wherein the local storage device contains the operating system.

12. The method of claim 9, wherein the searching step comprises:
 searching a storage device located remotely to the data processing system for the updated boot code prior to loading the operating system.

13. The method of claim 12, wherein the storage device is located on a server.

14. A data processing system comprising:
 a bus;
 a first storage device connected to the bus, wherein the first storage device includes current boot code instructions;
 a second storage device connected to the bus, wherein an operating system is located on the second storage device; and
 a processor unit connected to the bus, wherein the processor unit executes the current boot code instructions to determine whether updated boot code instructions are present in the second storage device, updates the current boot code instructions using the updated boot code instructions to form an updated set of boot code instructions if the updated boot code instructions are present on the second storage device, reinitializes the data processing system using the updated set of boot code instructions if the current boot code instructions are updated, and loads the operating system using the updated set of boot code instructions.

15. The data processing system of claim 14, wherein updating of the current boot code instructions is performed by replacing the current boot code instructions in the first storage device with the updated boot code instructions in the second storage device.

16. The data processing system of claim 14, wherein the processor unit loads the operating system using the current boot code instructions if updated boot code instructions are absent on the second storage device.

17. The data processing system of claim 16, wherein the updated boot code instructions are present if any boot code instructions are present on the second storage device.

18. The data processing system of claim 16, wherein the updated boot code instructions are present if a newer version of the current boot code instructions is present.

19. The data processing system of claim 14, wherein the first storage device is a non-volatile random access memory.

20. The data processing system of claim 14, wherein the second storage device is one of a removable non-volatile random access memory, a hard disk drive, a floppy disk, a CD-ROM, and a DVD-ROM.

21. The data processing system of claim 14, wherein the data processing system is one of a laptop computer, a palmtop computer, a personal computer, and a personal digital assistant.

22. A data processing system for updating a current boot code in which the current boot code is used to load an operating system, the data processing system comprising:
 loading means for loading a current boot code from a nonvolatile memory;
 initiating means for initiating a boot sequence using the current boot code;
 searching means for searching a storage device for an updated boot code for the operating system in response to initiating the boot sequence; and
 updating means for updating the current boot code in the non-volatile memory prior to loading the operating system for the data processing system if the updated boot code is present, wherein the updating means generates a new current boot code and further comprises:
  restarting means for restarting the data processing system using the new current boot code; and
  loading means for loading the loading system using the new current boot code.

23. The data processing system of claim 22, wherein the storage device is a non-volatile random access memory.

24. The data processing system of claim 22, wherein the operating system is stored on the storage device.

25. The data processing system of claim 24, wherein the storage device is a removable storage device locally connected to the data processing system.

26. The data processing system of claim 22, further comprising:

loading means for loading the operating system using the current boot code if the updated boot code is absent.

27. The data processing system of claim 22, wherein the updating means comprises:

replacing means for replacing the current boot code with the updated boot code prior to loading the operating system.

28. The data processing system of claim 22, wherein the updated boot code is present if a boot code is present on the storage device in which the boot code is a later version of the current boot code.

29. The data processing system of claim 22, wherein the updated boot code is present if a boot code is located on the storage device.

30. A data processing system for loading an operating system using a boot code, the data processing system comprising:

loading means for loading a current boot code;

searching means for searching, by the current boot code, for an updated boot code prior to loading the operating system;

determining means for determining, by the current boot code, whether the updated boot code is a later version of the current boot code; and updating means for updating the current boot code using the updated boot code responsive to the updated boot code being a later version of the current boot code, wherein the updating means generates a new current boot code and further comprises:

restarting means for restarting the data processing system using the new current boot code; and loading means for loading the operating system using the new current boot code.

31. The data processing system of claim 30, wherein the searching means comprises:

means for searching a local storage device for the updated boot code prior to loading the operating system.

32. The data processing system of claim 31, wherein the local storage device contains the operating system.

33. The data processing system of claim 30, wherein the searching means comprises:

means for searching a storage device located remotely to the data processing system for the updated boot code prior to loading the operating system.

34. The data processing system of claim 33, wherein the storage device is located on a server.

35. A computer program product in a computer readable medium for updating a current boot code in a data processing system in which the current boot code is used to load an operating system, the computer program product comprising:

first instructions for loading a current boot code from a non-volatile memory;

second instructions for initiating a boot sequence using the current boot code;

third instructions for searching a storage device for an updated boot code for the operating system in response to initiating the boot sequence; and fourth instructions for updating the current boot code in the non-volatile memory prior to loading the operating system for the data processing system if the updated boot code is present, wherein the instructions for updating the current boot code includes instructions to form a new current boot code and further comprises:

instructions for restarting the data processing system using the new current boot code; and instructions for loading the operating system using the new current boot code.

36. A computer program product in a computer readable medium for loading an operating system using a boot code, the computer program product comprising:

first instructions for loading a current boot code;

second instructions for searching, by the current boot code, for an updated boot code prior to loading the operating system;

third instructions for determining, by the current boot code, whether the updated boot code is a later version of the current boot code;

fourth instructions for updating the current boot code using the updated boot code responsive to the updated boot code being a later version of the current boot code, wherein the instructions for updating the current boot code includes instructions to form a new current boot code and further comprises:

instructions for restarting the data processing system using the new current boot code; and instructions for loading the operating system using the new current boot code.

* * * * *